Dec. 28, 1965 D. B. JAMES 3,226,484

TIME DIVISION TELEPHONE SIGNALING

Filed Nov. 17, 1961 5 Sheets-Sheet 1

INVENTOR
D. B. JAMES
BY G. E. Kerny

ATTORNEY

Dec. 28, 1965 D. B. JAMES 3,226,484

TIME DIVISION TELEPHONE SIGNALING

Filed Nov. 17, 1961

5 Sheets-Sheet 2

INVENTOR
D. B. JAMES
BY G. E. Kersey
ATTORNEY

INVENTOR
D. B. JAMES
BY G. E. Kersey
ATTORNEY

INVENTOR
D. B. JAMES
BY G. E. Kersey
ATTORNEY

INVENTOR
D. B. JAMES
BY G. E. Kersey
ATTORNEY 3,226,484
TIME DIVISION TELEPHONE SIGNALING
Dennis B. James, Bernardsville, N.J., assignor to Bell Telephone Laboratories, Incorporated, New York, N.Y., a corporation of New York
Filed Nov. 17, 1961, Ser. No. 153,118
11 Claims. (Cl. 179—15)

This invention relates to time division telephone systems and, more particularly, to auxiliary signaling in such systems.

A time division telephone system is able to serve a plurality of channels, handling concurrent messages, over a single transmission path without resort to frequency translation. This is possible because the information carried by a continuous message can be recovered from successive samples of its wave. Hence, the samples from various waves can be interleaved without overlap and transmitted directly as PAM (Pulse Amplitude Modulation) signals. Or, to achieve enhanced transmission in the presence of noise, each sample can be encoded, for example, into a train of two-valued PCM (Pulse Code Modulation) signals that are permuted according to sample amplitude.

Regardless of how each message channel sample, or its encoded counterpart, is transmitted, its occupied interval is denoted a time slot. Evidently, the number of concurrent message channels accommodated in a time division system is given by the ratio of the intersample interval to the time slot interval.

With coded samples the time slot interval depends upon the number of code constituents employed and upon the rate at which they can be generated. System design generally fixes this interval on the basis of anticipated service conditions. In that event, extraordinary service conditions cannot be accommodated by the system.

A similar consideration applies to the intersample interval which, from the sampling theorem, is the reciprocal of twice the highest frequency being transmitted. Hence, the number of system message channels is increased to the extent that the limiting frequency is reduced. However, that frequency is determined by the kind of service being provided. With a system intended for use with diverse kinds of service, it is difficult to optimize the number of channels. Thus, a design that suffices for all channels may more than suffice for a majority of them and conversely a design that is sufficient for most channels may be inadequate for selected ones of them.

Accordingly, it is an object of the invention to increase the versatility of a time division system designed on the basis of an average anticipated service condition. A related object is to enable the system to handle messages with higher frequencies than those prescribed by its basic design. An associated object is to permit the system to handle messages requiring greater time slot intervals than those of its basic design.

A message station connected to a time division system may serve as a point of origin for several classes of service, one of which includes a message directed to a point of destination. When a message of a second class of service originates at the station and is intended for the same destination as the first, it is advantageous to avoid duplication of switching equipment by assigning, to the second class of service, some of the equipment already assigned to service of the first class.

Accordingly, it is a further object of the invention to make increased assignment of time division switching equipment. An associated object is to use the equipment in establishing several classes of message service.

One situation where a time division telephone system handles several classes of service arises with combined audiophone and videophone transmissions. With ordinary audiophone service the highest voice frequency need not exceed about 4,000 cycles per second, making its message time slot intervals recur about 8,000 times per second. On the other hand, such a low recurrence rate is completely inadequate for videophone service, where, because of bandwidth requirements, even a small video picture with widely spaced scanning lines may require a time slot rate of approximately 500,000 per second.

As a result, a system design that is sufficient for voice is inadequate for video, but a design that is sufficient for video is more than adequate for voice. While the entire system could be designed for video, the number of time division channels that would result would be but a small fraction of those for a voice system. Furthermore, many subscribers with voice service would not require the additional video service, and a video subscriber would be unlikely to use his video facility on each transmission occasion.

Hence, a still further object of the invention is to provide occasional video transmission without sacrifice to the efficient transmission of time divided voice messages.

Also, since a time division telephone system is readily adaptable to the transmission of digital signals which minimize crosstalk between circuits, another object of the invention is to provide for the simultaneous transmission of both video and audio signals on a digital basis.

To achieve the above and related objects, the invention provides a time division auxiliary signaling system. In the signaling system a time division network, including a switch, is supplemented by an auxiliary network that is controlled by signaling over a preassigned time division message channel. The control signal can enter the auxiliary network over a signaling path by way of the time division switch and the preassigned channel may be that of a message station being served by the time division network.

When the auxiliary network includes a space division switch, with a plurality of incoming terminals and a lesser plurality of outgoing terminals, the control signal—dispatched over a signaling path—interconnects an incoming terminal with an outgoing one. If both the time division and space division switches are connected to similar message stations, two diverse classes of message service can be handled concurrently.

In particular, the space division switch of the auxiliary network can be used to furnish selected audiophone subscribers of a time division telephone system with videophone service as well. The time division switch serves as an audio concentrator and gives a limited number of subscribers simultaneous access to a central office. Similarly, the space division switch acts as a video concentrator. A control signal sent to the audio concentrator from its controller during a time slot interval activates a signaling path that links the audio and video concentrators. Subsequently a signal dispatched along the activated signaling path establishes a transmission path from the subscriber requesting video service to the central office through the space division network.

It is a feature of the invention that the signaling path stems from an audio concentrator terminal that would, absent the auxiliary network, be connected to a subscriber.

According to a further feature of the invention, the dispatched signal is derived directly from a master clock that regulates the basic time division system.

Another feature of the invention lies in the activation of the signaling path during the message channel time slot of the subscriber requesting video service. This allows establishment of the video transmission path without interference to the other message channels.

Other features of the invention will become apparent after the consideration of several detailed embodiments taken in conjunction with the drawings, in which.

Figure 1:
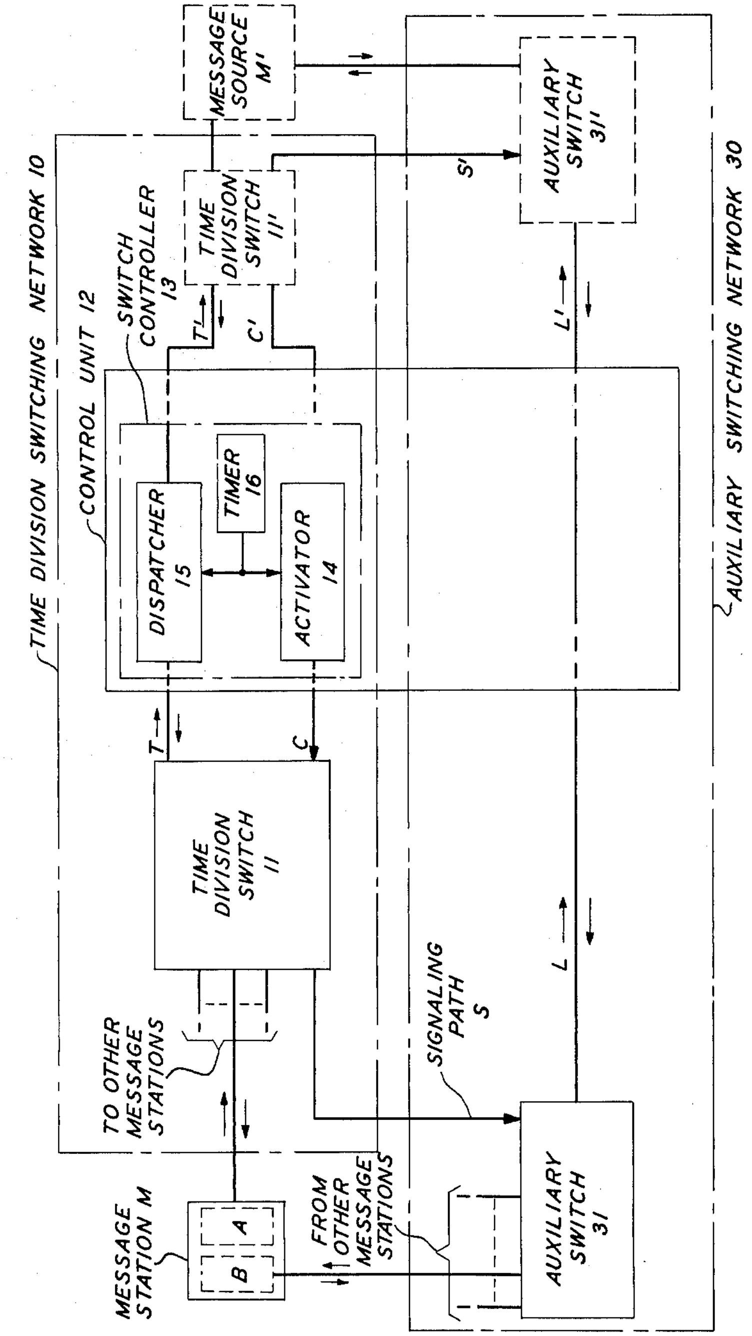
FIG. 1 is a block diagram of a time division auxiliary signaling system.

As demonstrated by the signaling system of FIG. 1, a time division switching network 10, providing one class of service to a message station M, can be used to control an auxiliary switching network 30 in order to provide that station M with a second class of service. Messages originating at the station are intended for other similar stations, one such station M' being shown.

Within the time division network 10 a switch 11 is interconnected with a control unit 12 by control and transmission paths C and T. Typically, the transmission path T has four wires, two for sending signals to the various stations and two for receiving signals from them.

During each recurrent time slot assigned to the originating station M by a switch controller 13 of the control unit, the transmission path T accommodates, by way of the control unit 12, time division signals that are sent between the originating station M and a similar station M' at a point of destination. The latter may be connected to another switch 11' that is coupled to another controller (not shown) of the control unit 12, as shown, or to the same switch 11 as the originating station M.

Ordinarily all line terminals of the switch 11 would be connected to message stations. However, when any of the various stations serves as a point of origin for diverse kinds of messages, the invention provides that those of a first kind, for which the time division network has been designed and according to which the occurrence of its time slots has been set, are interchanged in a conventional way by the time division network 10. But messages of a second kind, generally of a higher maximum frequency than the first or requiring a greater time slot interval, are accommodated through the auxiliary switching network 30; and one line terminal of the time division switch 11 is connected to an auxiliary switch 31 by way of a signaling path S.

When it is desired to transmit both kinds of messages, the signaling path S is switched to the time division transmission path T by an activator 14 in the switch controller 13 during one of the time slots normally used for messages of the first kind. This allows a code signal, originating at a dispatcher 15 in the controller, to be sent to the auxiliary switch 31 to establish a through transmission path from the message source M to the control unit 12 along an auxiliary link L. Because of a timer 16 in the controller 13, the activation of the signaling path S and the dispatch of the code signal takes place only during prescribed time slot intervals.

In FIG. 1 the link L passes directly through the control unit 12 to another auxiliary switch 31'. However, further switching can be employed in the control unit 12 to interconnect channels of the link L, so that messages of the second kind can be relayed between message sources coupled to a single auxiliary switch 31.

Figure 2:
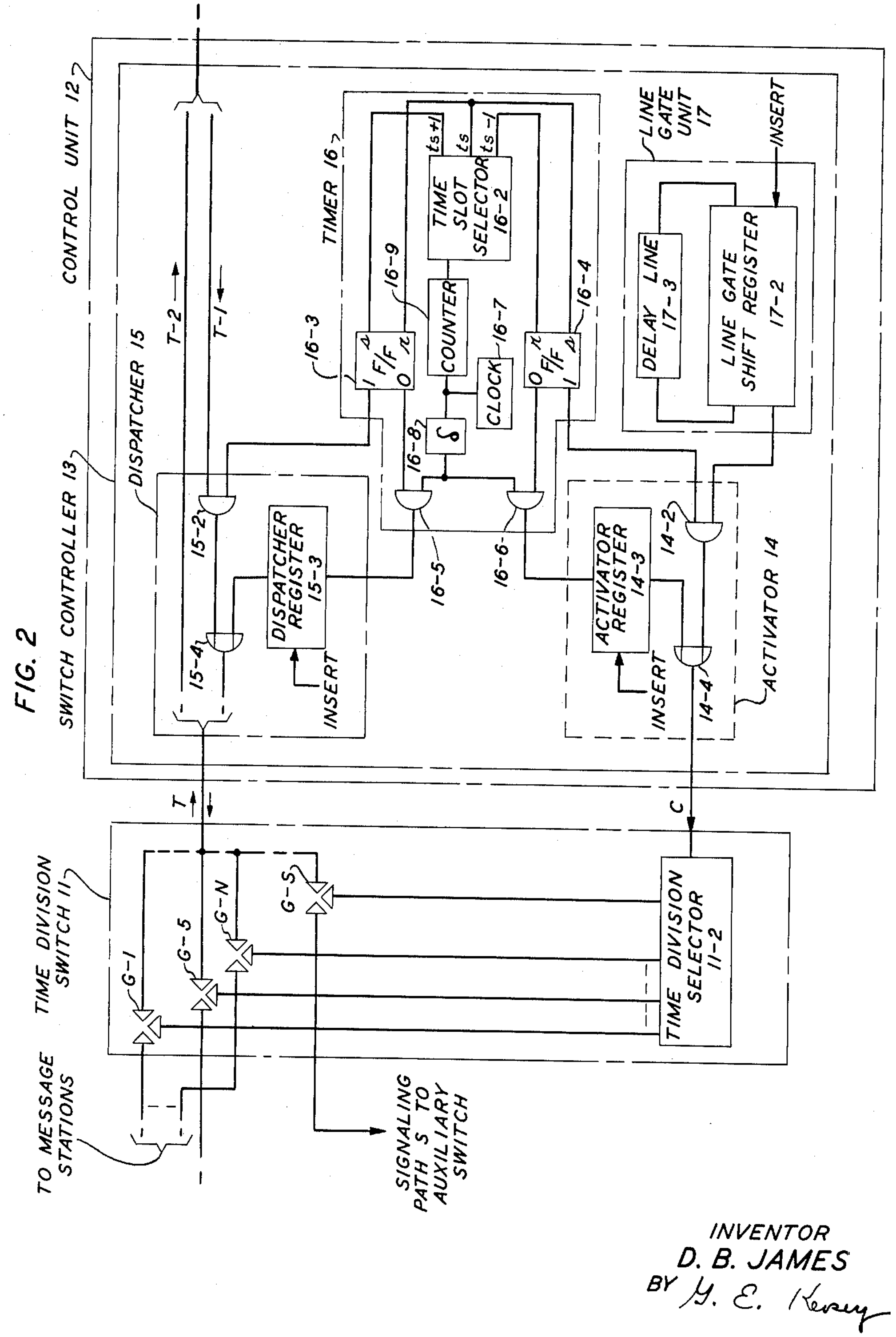
FIGS. 2 and 3 are schematic diagrams of representative constituents for the system of FIG. 1.

The way in which the signaling path S is activated will be evident from FIG. 2 where portions of the time division switch 11 and of the controller 13 are shown in greater detail. The control path C, extending from the control unit 12, causes a selector 11–2 positioned within the time division switch 11 to close various line gates G–1 through G–N during assigned time slots. The closing sequence is determined by a line gate unit 17 which is constituted of a shift register 17–2 that is made re-entrant by a delay line 17–3 through which successive code signals circulate. For each message channel to be used, a group of code signals is inserted into the line gate register 17–2. With each translation of a code group by the selector 11–2, the line gate G associated with the group is closed for one time slot interval, e.g., code group 0 . . . 0101 is translated to close line gate G–5. Since one terminal of the switch 11 is not connected to a message station, but is instead connected to the signalling path S, the code group of the number corresponding to its gate G–S is not customarily inserted into the line gate register 17–2.

However, when the signaling path S is to be activated, both the receive cable T–1 of the transmission path T and the control path C are disengaged from their usual connections. This is accomplished with a time slot selector 16–2 by changes in the signal states of timer flip-flops 16–3 and 16–4 whose triggering output levels ordinarily appear at dispatcher and activator AND gates 15–2 and 14–2. During the time slots selected for auxiliary activation and signaling, the triggering levels of the timer flip-flops 16–3 and 16–4 are instead applied to timer AND gates 16–5 and 16–6 along with pulse signals derived from a clock source 16–7. The clock pulses act as shifting signals in well-known fashion and cause the constituents of code words previously inserted into a dispatcher register 15–3 and an activator register 14–3 to appear sequentially on the receive cable T–1 and on the control path C through respective OR gates 15–4 and 14–4. First, the code group from the activator register 14–3, as translated at the time division selector 11–2, closes the signaling path gate G–S. Then the code group from the dispatcher register 15–3 passes through the gate G–S along the signaling path S into the auxiliary switch 31 (FIG. 1) where it directs the establishment of an auxiliary transmission path from the B portion of the message station M. At the end of appropriate time slots, which are determined by the time slot selector 16–2, the timer flip-flops 16–3 and 16–4 are returned to their original signal states to terminate the register shifting signals and to restore the prior connections of the receive cable T–1 and the control path C. Thus, the brief diversion of a message channel for an A portion of message station M suffices for the establishment of an auxiliary channel from the B portion of the same or another station.

In order that the timer flip-flop 16–3 and 16–4 shall change state slightly before the appearance of the first clock signal during assigned time slots, the clock signals are retarded in a delay unit 16–8 before being applied to timer AND gates 16–5 and 16–6. To identify the successive time slots, a pulse counter 16–9 gives an output at the termination of each group of clock signals constituting a time slot *ts*. From these outputs the time slot selector 16–2, desirably another counter, is able to give indications *ts*—1, *ts*, and *ts*+1 marking the beginnings and the terminations of selected and immediately preceding time slots. By the end of the preceding slot, the signalling path will have been activated and during the selected slot the control signal is dispatched.

Figure 3:
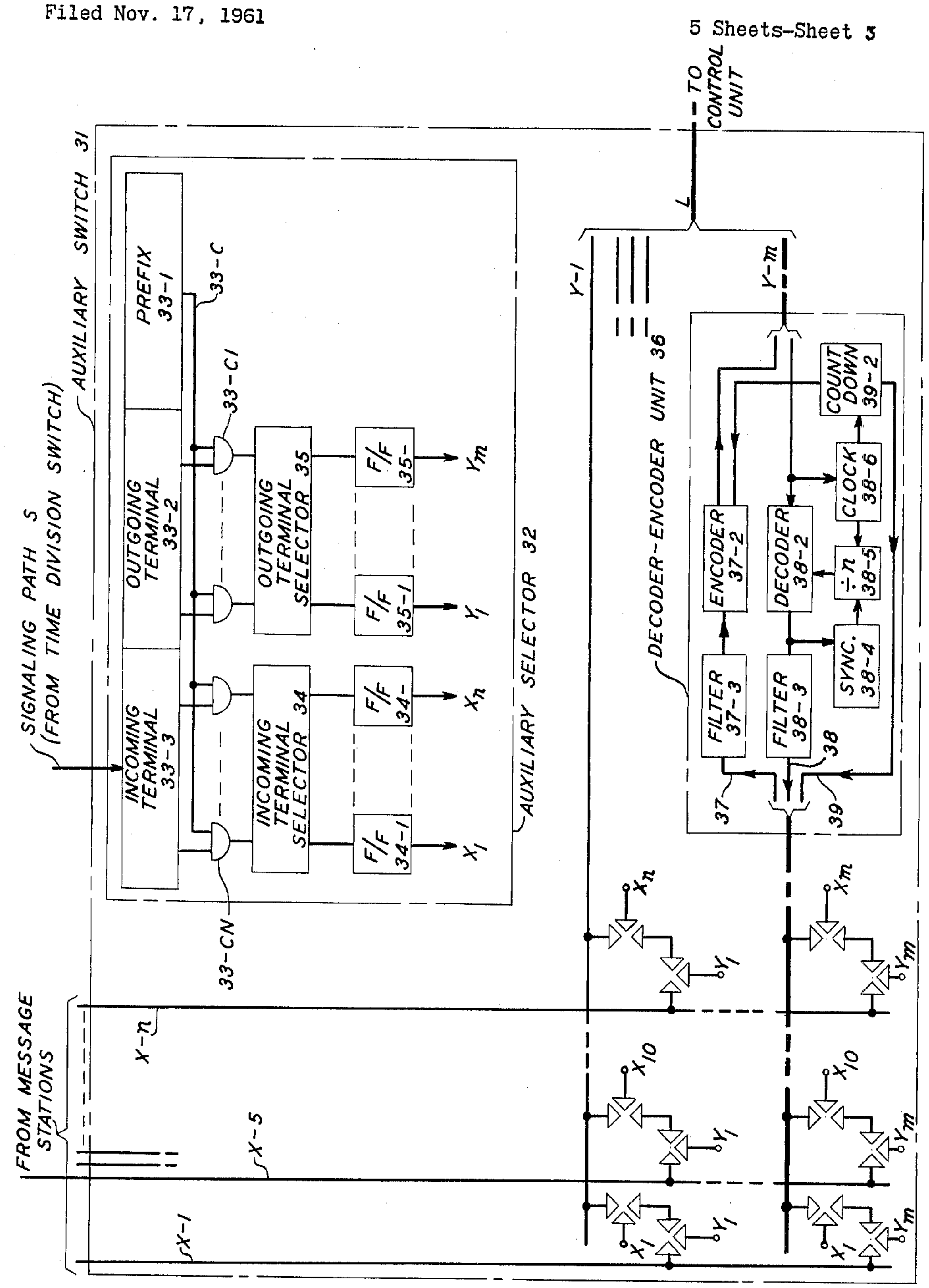

A representative switch for the auxiliary switching network 31 is of the space division variety indicated in FIG. 3. Incoming line terminals designated X–1 through X–*n* from selected message sources cross a lesser number of outgoing line terminals designated Y–1 through Y–*m* that are included in a link L extending to the control unit (FIG. 1).

At each crosspoint of the auxiliary switch are two normally open gates $X_x$ and $Y_y$ ($x=1$ . . . or $n$, $y=1$ . . . or $m$) that are controlled by an auxiliary selector 32. The selector, which is activated through the signaling path S, is constituted of a shift register 33 with three sections for successive portions of a code group for incoming terminal, outgoing terminal and prefix designations. When the prefix portion of a code group from the dispatcher register 15–3 (FIG. 2) has occupied the prefix section 33–1 of the selector register, a control lead 33–C is energized causing the code subgroups within the other sections 33–2 and 33–3 of the register to enter respective terminal selectors 34 and 35 through AND gates 33–C1 through 33–CN. The incoming selector 34 translates its code subgroup to direct a change in state of an appropriate one of its line flip-flops 34–1 through 34–*n*. The outgoing selector operates in a similar fashion upon its flip-flops 35–1 through 35–*m*. These line flip-flops close designated $X_x$ and $Y_y$ auxiliary gates, establishing an auxiliary transimission path from an incoming auxiliary terminal to an outgoing auxiliary terminal. For example, a code signal that results in connecting the first incoming terminal *x*–1 with the third outgoing terminal *y*–3 can take the form, reading from right to left: 0 . . . 01; 0 . . . 11; 1—of which the first digit constitutes a prefix. It is to be noted that one of the outgoing terminals includes a decoder-encoder unit 36 whose purpose is explained shortly.

Thus, in response to the control signal briefly inserted into a time slot of a class A time division message channel, a class B space division message channel is established simultaneously.

When the connection in the auxiliary switch 31 is no longer needed, the previously dispatched code group is reinserted into the selector register 33, resetting the flip-flops that have been holding auxiliary gates $X_x$ and $Y_y$ in their closed poistions.

With an originating station generating two classes of message, the second requiring a greater transmission capacity than the first, but both destined for the same receiving station, it is desirable to establish a time division channel for the first class of message and then briefly insert a control signal into the time slot of the established channel to establish a higher capacity space division channel for the second class of message.

Figure 4A:
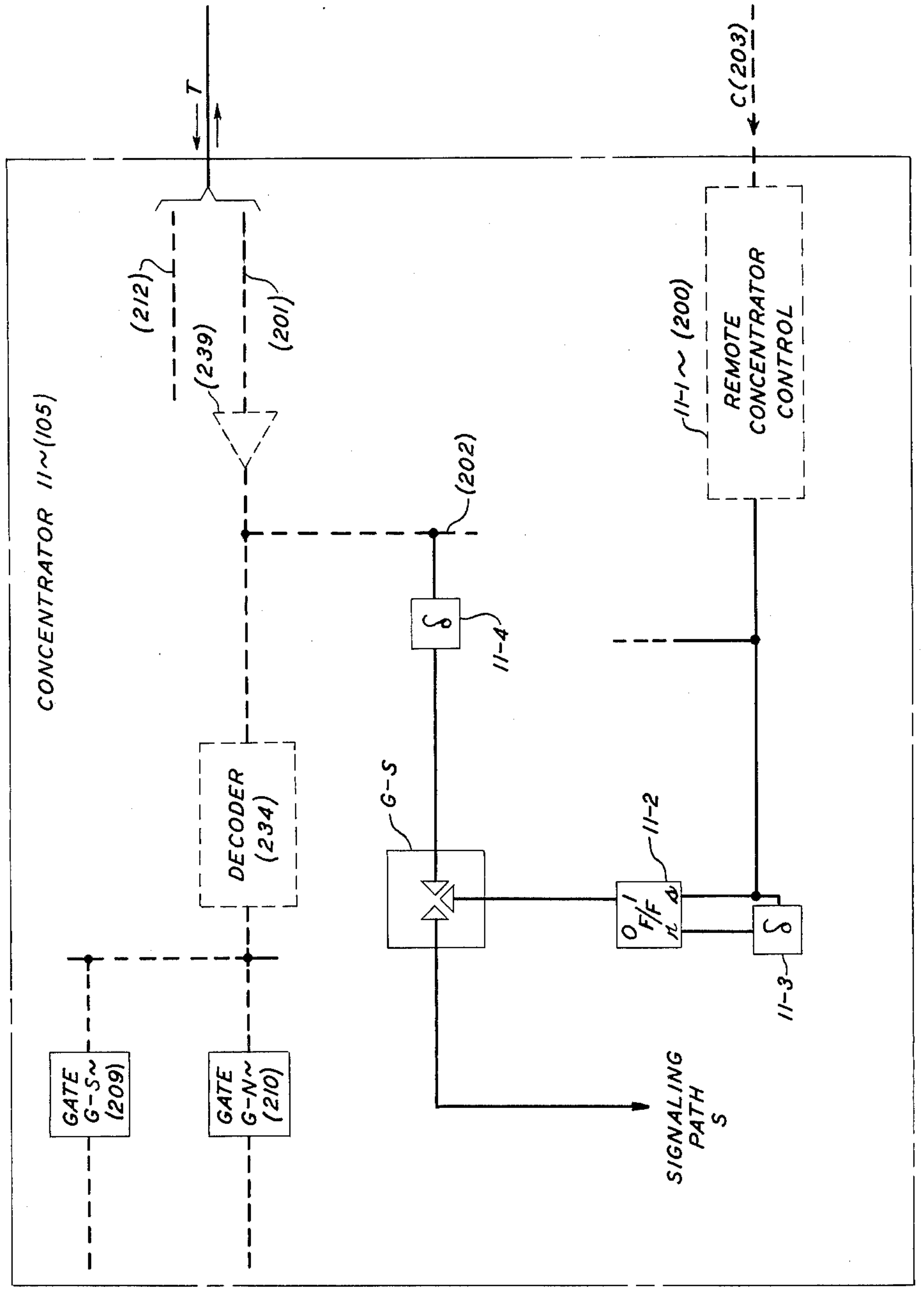
FIGS. 4A and 4B are respective schematic diagrams of an adapted time division switch and an adapted control unit for a digital video telephone system.
Figure 4B:
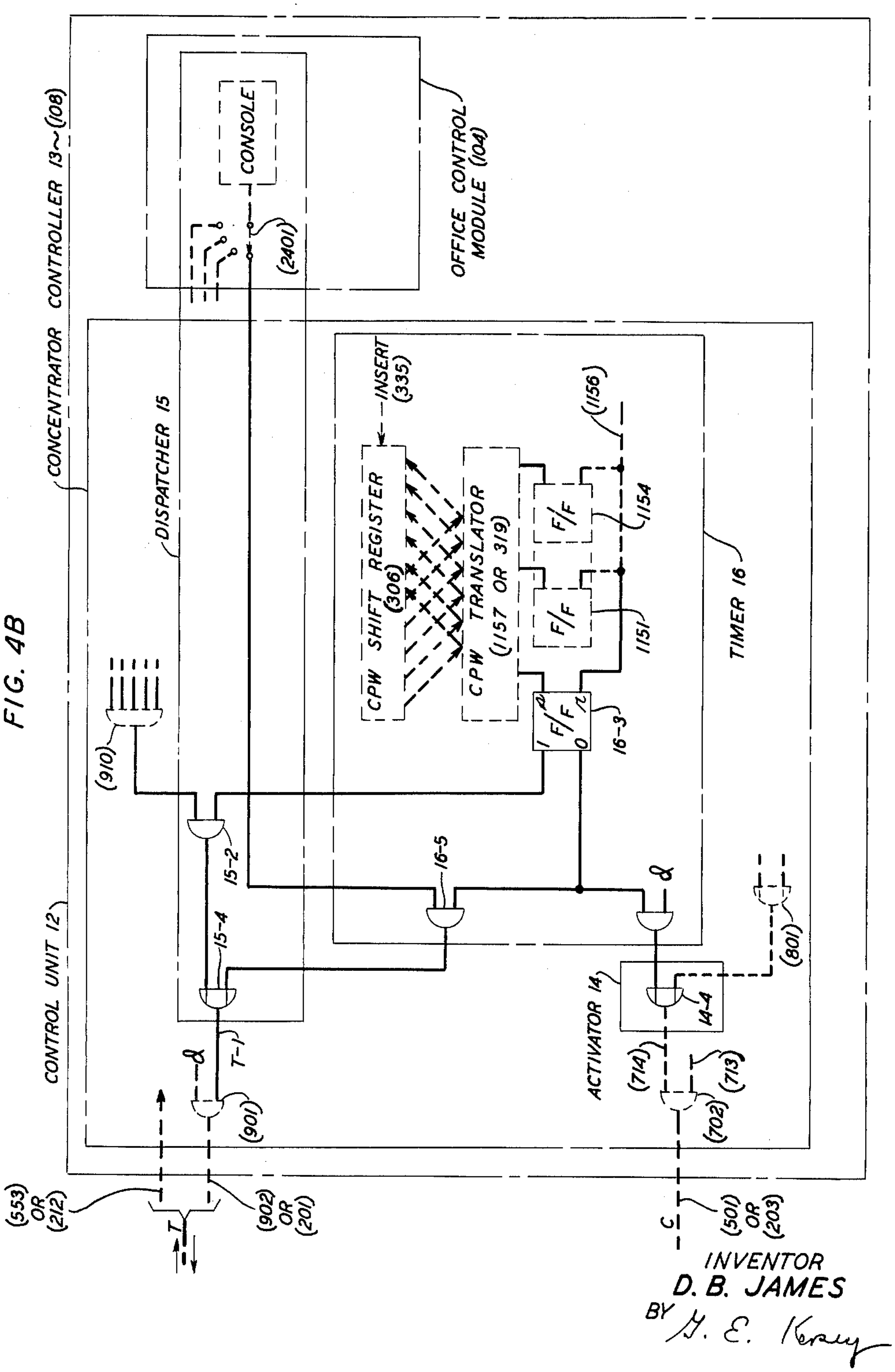

In keeping with the invention this procedure is used to provide a basic time division audiophone system with digital videophone service. An appropriate audiophone system is disclosed in Patent 2,957,949 issued to D. B. James et al., October 25, 1960. With reference to the patent, if the typical subscriber 106 of reference FIG. 1 is supplied with a picture scanner and a picture display unit, constituting component B of a message station M in FIG. 1, in addition to an ordinary telephone handset, constituting component A of the station M, the modifications indicated in FIGS. 4A and 4B are needed in the concentrator 105 and the concentrator controller 108 of reference FIG. 1. Also required is the space division network of FIG. 3, which becomes a space division concentrator interconnected by the signaling path S with the concentrator 105 of reference FIG. 1.

The controller 108 and the concentrator 105 are fully described in the patent in conjunction with numerous auxiliary figures whose components are numbered to indicate, by the first digit of each numerical designation, the figure in which they are located. Thus, the concentrator controller 108 is located in reference FIG. 1 and the AND gate 901 is located in reference FIG. 9.

For clarity, the modification components in FIGS. 4A and 4B are shown in solid-line form, while the original components of the controller and the concentrator closely associated with them are reproduced from the patent in dashed-line form and are designated parenthetically by the same numbers used in the patent. Since some of the components appear in more than one reference auxiliary figure, they have several parenthetical designations. Besides the parenthetical designations, the earlier numerical designations of FIGS. 1 through 3 have also been employed where there are component similarities. Hence, the concentrator in FIG. 1 is designated (105)∼11, i.e., the concentrator 105 from FIG. 1 of the patent serves a function similar to that of the time division switch 11 of instant FIG. 1.

As modified, the concentrator controller produces the dispatching, activating, and timing functions discussed in conjunction with FIG. 2. However, instead of being operated directly by a time slot selector, the timer flip-flop 16–3 (FIG. 4B) responds to a call progress word unit CPW and operates in a manner similar to that of pre-existing call progress word flip-flops 1151 through 1154. Hence, when the receive cable T–1 of the transmission path is to be disengaged, an appropriate code group, i.e., code word, for the timer flip-flop 16–3 is entered into the call progress word register 306. For convenience and to facilitate the proper ordering of calls, the call progress code word for the timer flip-flop 16–3 is entered into the register 306 so that it is available during the time slot assigned to a calling party desiring to use his supplementary video facility. Thereupon clock pulse signals at the timer AND gate 16–6 cause the scan gate and line gate signals at OR gate 801 to be overridden, so that the output of the activator OR gate 14–4 consists of a sequence of pulse signals enduring over a time slot interval. Upon receipt of this sequence the remote concentrator control 200 of FIG. 4A closes a signaling path gate G–S. This activates a signaling path S that extends from the concentrator 105 to the space division network 30 (FIG. 1). Consequently, a code group for controlling the space division switch 31 can be inserted into a console, which substitutes for the dispatcher register 15–3 of FIG. 2 and is connected to the receive cable T–1 through an added position on a console selector switch 2401 and dispatched along the activated signaling path S. The console is similar to other central office consoles described in the patent and used to insert code groups into various registers during selected time slot intervals.

In the concentrator 105 of FIG. 4A the signaling path gate G–S is connected directly to a cable 202 instead of to a decoder 234 as are the other line gates 209 and 210. Otherwise, since the decoder converts each incoming code group into a pulse amplitude signal, the auxiliary selector 32 in the space division concentrator of FIG. 3 would have to be made responsive to pulse amplitude rather than pulse code signals. Although this could be done in well-known fashion, the auxiliary selector operates more precisely on a digital basis.

So that the signaling path gate G–S (FIG. 4A) will remain closed long enough for the signaling code group to enter the selector 32 (FIG. 3) of the space division concentrator 31, a holding flip-flop 11–2 is included between the gate G–S and the remote concentrator control 200. Near the end of the sampling time slot interval the holding flip-flop 11–2 is returned to its original signal state by a reset signal, which is retarded by a delay line 11–3 for slightly less than a time slot interval to prevent interference with the operations of the other gates.

In addition, to assure the arrival of the signaling code group at the gate G–S at the proper time, a delay unit 11–4 is included in the path linking the gate with the control cable 202. This unit 11–4 is set to provide a nine-bit delay. On the other hand, the delay unit 11–4 can be omitted if the gate is connected to stage 64 of the receiver shift register 600 (not shown) in reference FIG. 6, instead of directly to the control cable 200.

For simplicity, the system of FIG. 1, as explained with the line gate unit 17 of FIG. 2, did not involve the scanning of the various line gates to determine requests for service, but it is to be understood that in a telephone time division system the ordinary call progress sequence takes place as described in the patent and that when a talking path has been established between calling and called parties, the call progress word becomes 10010010 "connected for talking" (see FIG. 36 of the patent).

To operate the timer flip-flop 16–3 (FIG. 4B), its code word is inserted into the call progress word register 306 to be available during the selected time slot interval. After a video connection is established, the call progress word register 306 is returned to its "connected for talking" condition. When the video connection is to be disestablished, the call progress word register 306 is returned to its auxiliary signaling condition to reset the holding flip-flops in the space division concentrator switch 31 of FIG. 3. Subsequently, the ordinary call progress sequence of FIG. 36 in the patent is resumed.

Thus far, attention has been directed to establishing a video transmission path. Once that is done, the nature of the video transmission must be considered.

If the video facility is to be of the digital variety, at least one of the outgoing auxiliary lines in FIG. 3 includes a decoder-encoder unit 36.

From such a unit 36 three paths 37, 38, and 39, included in an auxiliary terminal cable, extend through selected auxiliary gates to a message station M. Two of the paths 37 and 39 connect to a camera (not shown) in the B portion of the station for respectively driving the camera with line, and frame signals derived from a conventional count-down circuit 39–2 and for applying picture signals to an encoder 37–2. The third path 38 extends from a decoder 38–2 and terminates at the B portion of the station in a picture display monitor (not shown) having internal sweep and synchronizing circuits. Both the encoder 37–2 and decoder 38–2 are adapted to handle three-bit differential pulse code modulation, as band limited by low-pass filters 37–3 and 38–3 with cutoff frequencies of 256 kilocycles. Framing of the decoder is accomplished by the combined action of a synchronizing detector 38–4, a divide by-three counter 38–5 and a 1.536 megacycle slave clock 38–6, all operating in the fashion described in the copending application of D. B. James et al. (12–2), filed April 21, 1961.

When the video code signals are transmitted over a great distance, they are retimed and regenerated at repeaters (not shown) stationed along the link L between the auxiliary switch 31, which becomes a remote video concentrator, and the concentrator controller 108 of FIG. 4B. Then synchronization is maintained between the slave clock 38–6 and the controller by the retiming action of the repeaters. In addition, quantizing noise difficulties associated with sampling and coding are prevented from drifting through a received picture by having the camera sweep a submultiple of the same clock 38–6 that drives the encoder. Absent regeneration, the slave clock 38–6 of the encoder-decoder unit is synchronized by deriving its input from the control path C of a nearby remote audio concentrator 105 (FIG. 4A).

Further, when the time division system of the patent is supplemented by the video link L, the latter includes a delay pad (not shown) with a range of 0.65 microsecond. Its operation is similar to that of the pre-existing 125 microsecond delay pad 309 (not shown) in the time division transmission path 212 of the patent.

While time division auxiliary signaling has been illustrated primarily in the context of auxiliary space division switching, numerous other contexts will occur to those skilled in the art. Also apparent will be many ways of realizing specific embodiments of the invention.

What is claimed is:

1. Time division signaling apparatus which comprises a time division switching network having a first plurality of terminals, some of which are connected to sources of a first kind to which are assignable individual and recurrent time slot intervals; an auxiliary switching network having a control point and a second plurality of terminals connected to sources of a second kind, distinctive from the first; a signaling path interconnecting the control point of said auxiliary network with one terminal of said time division network; means for activating said signaling path during a preassigned time slot; and means for dispatching a control signal over the activated path to said auxiliary network to switch therethrough one of the sources of said second kind.

2. Time division telephone signaling apparatus which comprises a time division switching network having a first plurality of terminals, a group of said terminals being connected to distinctive message stations to which are assignable individual and recurrent time slot intervals constituting channels of communication for message waves of a first kind, selected ones of said stations generating message waves of a second kind as well; an auxiliary switching network having a control point and a second plurality of terminals connected to said selected stations; a signaling path interconnecting the control point of said suxiliary network with one terminal of said time division network; means for activating said signaling path during a preassigned time slot constituting a channel of communication for a message wave of the first kind originating at one of the selected stations; and means for dispatching a control signal over the activated signaling path to said auxiliary network to establish therethrough an auxiliary channel of communication for a message wave of the second kind originating at the selected station.

3. Apparatus as defined in claim 2 wherein said auxiliary network comprises a space division network having said second plurality of incoming terminals and a lesser number of outgoing terminals and means connected to said control point for establishing a through path from a selected one of said incoming terminals with a selected one of said outgoing terminals.

4. In combination with apparatus for establishing an audio connection between a calling party and a called party comprising a time division concentrator connected to the calling party, a controller for said time division concentrator, and means responsive to said controller for providing audio access to the called party during a time slot assigned to said calling party; apparatus for simultaneously establishing a video connection between the parties comprising a space division concentrator connected to the calling party, a signaling path extending from said time division concentrator to said space division concentrator, means for activating said signaling path during said time slot; means for dispatching a control signal to said space division concentrator over said activated signaling path during said time slot; and means responsive to said control signal for providing access from said space division network to the called party; thereby to establish a video path from said calling party to said called party through said space division network.

5. In combination with apparatus for establishing an informational connection between one station and another station comprising a time division concentrator connected to the one station, a controller for said time division concentrator, and means responsive to said controller for providing access to the other station during a time slot assigned to said one station;

apparatus for simultaneously establishing a second informational connection between the stations comprising a space division concentrator connected to the one station, a signaling path extending from said time division concentrator to said space division concentrator, means for activating said signaling path during said time slot, means for dispatching a control signal to said space division concentrator over said activated signaling path during said time slot, and means responsive to said control signal for providing access from said space division network to the other station, thereby to establish a second informational path from said one station to said other station through said space division network.

6. Apparatus for establishing several classes of service among message stations, which comprises a time division switch comprising a plurality of transmission gates connected to the message stations and a time division selector for said gates, a transmission path connected to said gates, a control path connected to said selector, a control unit comprising a dispatcher, connected to said transmission path, a line gate unit connected to said control path, an activator included in said control path, and means for timing said dispatcher, said activator and said line gate unit, an auxiliary switch comprising a first plurality of lines connected to selected ones of said message stations, a second plurality of lines connected to the control unit, and means for connecting selected ones of said first plurality of lines with selected ones of said second plurality of lines, and a signaling path interconnecting one gate of said time division switch with the connecting means of said auxiliary switch.

7. Apparatus as defined in claim 6 wherein said dispatcher comprises a register into which a preassigned group of code signals is inserted, and means for disengaging the transmission path connected to said dispatcher from the remainder of said control unit.

8. Apparatus as defined in claim 6 wherein said activator comprises a register into which a preassigned group of code signals is inserted, and means for disengaging said control path from the remainder of said control unit.

9. Apparatus as defined in claim 6 wherein said means for timing comprises means for indicating the beginnings and the terminations of selected and immediately preceding time slot intervals, a first two-state device connected to said dispatcher and "set" at the termination of a selected time slot interval, a second two-state device connected to said activator and "set" at the beginning of said selected time slot interval, said first two-state device and said second two-state device being respectively "reset" at the beginnings of selected and an immediately preceding time slot intervals, and gating means connected to the first and second two-state devices for controlling said dispatcher and said activator.

10. Apparatus as defined in claim 6 wherein the connecting means of said auxiliary switch comprises a shift register having a first section for storing code signals identifying one of said first plurality of lines, a second section for storing code signals identifying one of said second plurality of lines, and a third section for storing a prefix code signal, a first set of gates connected to the lines of said first plurality, a second set of gates connected to the first set and to the lines of said second plurality, means connected to the first section of said register for selecting among the gates of said first set, means connected to the second section of said register for selecting among the gates of said second set, and means controlled by the third section of said register for operating the first and second mentioned selecting means.

11. Time division switching apparatus comprising a time division switch with lines extending to various stations, comprising a plurality of line gates operated by a time division selector, and variously connected to message stations and a signaling path, a line gate unit for controlling said time division selector and constituted of a re-entrant shift register through which successive code signals circulate for controlling all gates except one gate connected to said signaling path, and means for overriding the code signals of said line gate register by signals for controlling said one gate connected to said auxiliary path.

References Cited by the Examiner

UNITED STATES PATENTS

| | | | |
|---|---|---|---|
| 2,830,125 | 4/1958 | Elliott | 179—15 |
| 2,861,128 | 11/1958 | Metzger | 179—15 |
| 3,050,589 | 8/1962 | Vaughn | 179—15 |

DAVID G. REDINBAUGH, *Primary Examiner.*

ROBERT H. ROSE, STEPHEN W. CAPELLI, *Examiners.*